THERMOELECTRIC REFRIGERATOR STRUCTURE

Filed Dec. 30, 1963 3 Sheets-Sheet 1

GORDON D. PETRIE,
INVENTOR.

BY
Berkeley & Lewis

THERMOELECTRIC REFRIGERATOR STRUCTURE

Filed Dec. 30, 1963 3 Sheets-Sheet 2

GORDON D. PETRIE,
INVENTOR.

BY Barlow + Lewis

Feb. 9, 1965 G. D. PETRIE 3,168,816

THERMOELECTRIC REFRIGERATOR STRUCTURE

Filed Dec. 30, 1963 3 Sheets-Sheet 3

GORDON D. PETRIE,
INVENTOR.

BY
Barkelew & Lewis

United States Patent Office 3,168,816

Patented Feb. 9, 1965

3,168,816

THERMOELECTRIC REFRIGERATOR STRUCTURE

Gordon D. Petrie, Glendale, Calif.
(3130 W. Voltaire Ave., North Phoenix, Ariz.)

Filed Dec. 30, 1963, Ser. No. 334,484
10 Claims. (Cl. 62—3)

This invention has to do generally with thermoelectric refrigerators, and relates especially to such refrigerators in which the thermoelectric elements are concentrated in one or more compact units, which will be referred to as modules. Such modules typically have two opposite plane parallel working faces. When properly energized by direct current of suitable polarity, one working face of the module becomes hot and the other becomes cold, due to transfer of heat from the cold to the hot junctions.

Such refrigerators have been described which utilize a metal structure for conducting heat from the interior walls of the refrigerator to the cold side of the module; and a second metal structure for conducting heat from the hot side of the module to the exterior of the case, where it is transferred to the surrounding air. However, such prior structures have several disadvantages, among which are the fact that transfer of heat is impeded by joints between distinct metal elements. Also, excessive mechanical stresses may be exerted upon the modules themselves, tending to weaken or destroy them or to break the desirable close contact between the working faces of the modules and the adjoining heat conductive structures.

An important aspect of the present invention provides more economical, effective and reliable heat conductive and mounting structure for the thermoelectric modules, whereby they may be safely operated at maximum effectiveness.

A further aspect of the invention has to do with improved means for transferring heat from the hot side of the module to the surrounding air.

The invention further provides improved mounting and housing structure for the electrical power system that supplies direct current power to the modules.

The invention further provides numerous structural features that improve the economy, convenience and performance of refrigerators of the described type, particularly those intended for portable use, as will become clear from the following description.

A full understanding of the invention, and of its further objects and advantages, will be had from the following description of an illustrative manner of carrying it out. The particulars of that description, and of the accompanying drawings which form a part of it, are intended only as illustration, and not as a limitation upon the scope of the invention, which is defined in the appended claims.

Figures 1, 7:
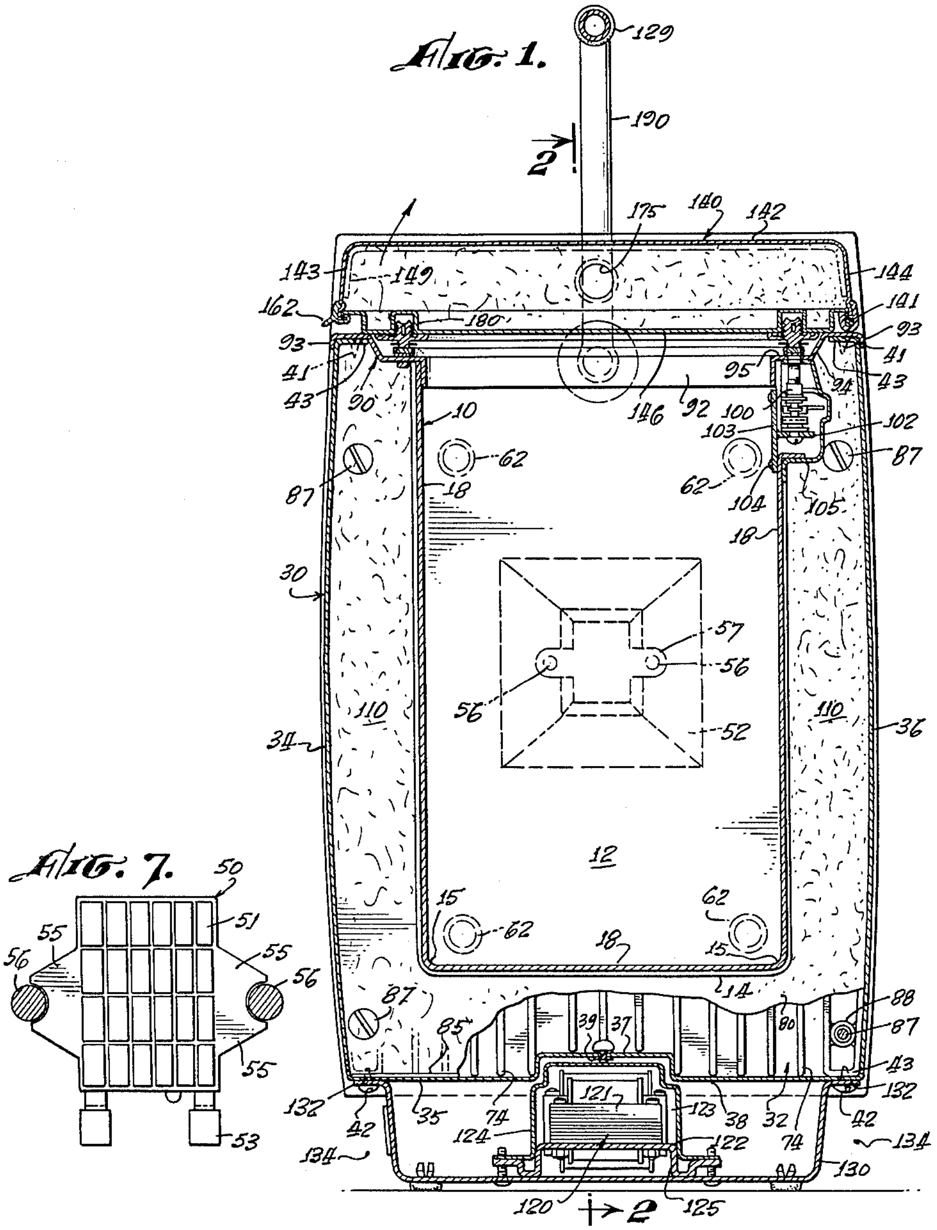
FIG. 1 is a vertical central section representing an illustrative portable refrigerator in accordance with the invention.
FIG. 7 is a section on the line 7—7 of FIG. 2 at enlarged scale.

The present illustrative refrigerator comprises the inner case structure indicated generally by the numeral 10, and the outer case structure 30, which spacedly surrounds inner case 10. Both cases are open at the top, the space between inner and outer cases being sealed along the top edge of the inner case by the breaker strip 90. The insulated door 140 is hinged on the pivot 141 at the rear upper edge of the case assembly and provides access to the interior of the inner case.

Figure 2:
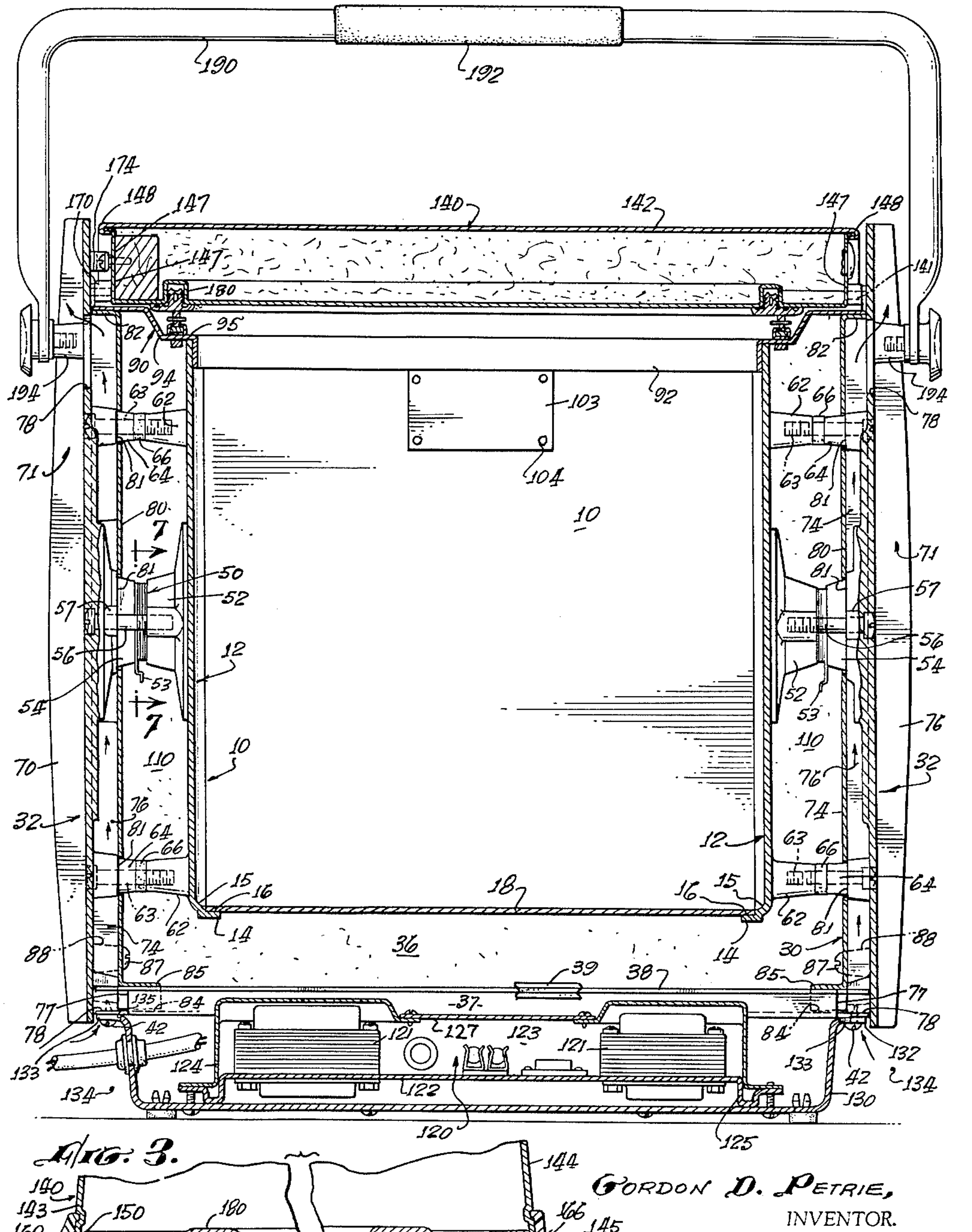
FIG. 2 is a vertical section on the line 2—2 of FIG. 1.

The left and right vertical case walls seen in section in FIG. 2 will be referred to for convenience of reference as the case ends. The left and right vertical walls as seen in FIG. 1 will be similarly referred to as the front and back walls, respectively.

The end walls of inner case 10 consist essentially of the respective unitary cold plates 12. They are formed, typically by casting, of a suitable material having high heat conductivity, such as aluminum, for example. Cold plates 12 have an inwardly extending peripheral flange 14 except at their top edges. The inner corner between that flange and the plate proper is rounded, as shown at 15, and the outer edge portion of the flange is offset to form the angle 16. The inner liner 18, comprising sheet of high heat conductivity such as aluminum, is bent to U-form to conform to the flange 14 of the cold plates, as shown best in FIG. 1, and forms integrally the front, back and bottom of the inner case. The side edges of liner 18 fit closely in angle 16 of plate flange 14, and are spotwelded to it to form a rigid inner case structure.

The end walls of outer case 30 consist essentially of the respective unitary end plates 32, which act as hot plates or heat sinks for the refrigerator. Those plates, like cold plates 12, are formed typically by casting and comprise a suitable material having high heat conductivity such as aluminum. Each of the hot plates carries heat dissipating fins on both its inner and outer faces, which fins are more fully described below. The front wall 34 of the outer case is formed of sheet material, typically aluminum with a decorative lamination of vinyl or the like. The sheet forming wall 34 includes a lower portion 35 bent back at right angles to form the front half of the bottom of the outer case. The back wall 36 is formed of a similar sheet, with its lower portion 38 bent forwards to form the rear half of the case bottom. The abutting edge portions of those sheets are offset upwards, forming a central ridge 37 of rectangular section that extends the entire length of the bottom of the outer case. The sheet edges are held in alinement by an aluminum extrusion of H-section, shown in section at 39 in FIG. 1. The front and rear walls and the bottom are thus essentially a unitary structure. That wall structure is connected to each of the end plates 32 by means of two upper screws 41 and two lower screws 42, which enter horizontal flange structures 43 formed integrally on the hot plates. The case bottom is cut back at 77 from the face of each hot plate to provide air passages to be more fully described, leaving the corner ears 78 which receive screws 42. The holes in wall sheets 34 and 36 for screws 41 and 42 are preferably oversize, so that the precise relative spacing of the two hot plates is determined initially by other structure to be described. However, once those screws are driven home, the outer case forms an effectively rigid unit.

Heat is pumped from the interior of inner case 10 to the exterior of outer case 30 for disposal to the surrounding atmosphere by means of thermoelectric junctions which are concentrated in known manner in two small junction assemblies 50. Those assemblies will be referred to as modules. Each module has two plane parallel faces and consists essentially of an array of closely packed thermoelectric elements 51 that extend transversely from one face to the other. The elements are formed of semiconductor material of alternately n-type and p-type. The elements are electrically connected in series in such a way that the current passes from n- to p-type adjacent one face of the module, and passes from p- to n-type adjacent the other face. When direct current is passed through the array, one face of the module becomes cold and the other hot, depending upon the polarity of the current. Illustrative arrangement of junction elements 51 is indicated in FIG. 7. Electrical terminals are shown at 53, but connecting wires for supplying power to the modules are omitted in the present drawings for clarity of illustration of other structure.

Each module 50 is mounted between the flat face of the central boss 52 on the outer face of a cold plate 12 and the opposing flat face of the central boss 54 on the inner face of the corresponding hot plate 32. The electrically conductive module faces are insulated electrically from the mounting bosses by a thin layer of dielectric which limits the flow of heat as little as possible. Such electrical insulation may be provided, for example, by a heavy anodic coating of aluminum oxide on the mounting faces of the bosses. That layer may be supplemented by a thin coating of laquer, for example, or silicone grease. In the present structure the module position on the mounting faces is accurately defined by the ears 55, which are fixedly mounted on the modules and are notched to fit between defining elements 56 of insulating material. Those defining elements may comprise pins set in one or both bosses, but are shown as bolts of dielectric material such as nylon, for example, mounted in bores in wing portions 57 of the respective bosses.

In accordance with the present invention, bosses 52 and 54 are formed integrally with the respective cold and hot plates, as by casting, so that there is no interface between adjacent elements to impede heat flow between the working face of the boss on which the module is mounted and the entire area of the opposite face of the plate structure. That integral structure adds significantly to the thermal efficiency of the device. The module supporting bosses 52 and 54 are located centrally of the respective plates, providing essentially uniform heat withdrawal from the entire area of the inner case end wall and essentially uniform heat distribution to the entire area of the outer case end wall.

The present invention further provides supporting bosses 62 that are integrally formed on the outer face of cold plate 12 adjacent its corners, and bosses 64 formed integrally on the inner face of hot plate 32 in position to directly oppose the cold plate bosses 62. Those supporting bosses are axially bored. The bores in bosses 62 are threaded and those in bosses 64 are counterbored at their outer ends to receive the bolts 63. Those bolts are constructed to have low heat conductivity combined with good strength. Bolts consisting primarily of nylon, with axial steel cores have been found especially effective for use at 63 and also at 56. The heat flow between opposing supporting bosses is limited by forming them with cross-sectional dimensions small compared to the distance that they extend from the plate faces. The cross-sectional area of the bosses is further reduced to a thin annular form by the bores, just described. The heat transfer is reduced to negligible proportions by introducing annular spacing elements 66 of a suitable dimensionally stable, heat insulating material. The working faces of the supporting bosses on each plate are machined to the same plane as the mounting face of central boss 52 or 54. Annular spacers 66 are then inserted between the mounting bosses, the spacers having essentially the same thickness as the modules 50.

In preferred form of the invention, spacers 66 are formed of nylon, and are thinner than modules 50 by approximately 0.004 inch. When the bolts 63 are tightened a uniform compressive force is thereby applied to the modules by the resilience of the hot and cold plates. That construction provides an extremely effective and simple means for holding the modules securely in place and insuring effective heat conductivity at their working faces without risk of injuring the module or breaking the electrical insulation at those faces. The supporting bosses 62 and 64 are located as far as is feasible from the module-supporting central bosses 52 and 54, providing increased moment for resisting twisting stresses that may be applied to the hot plate, as by impact during transportation of the refrigerator. Each hot plate 32 and its associated cold plate 12 thus form an effectively rigid assembly, effectively protecting the relatively delicate modules from damage by such stresses. Such effective rigidity and protection is afforded without requiring massive supporting structures, which would not only be objectionable in any portable device, but would reduce its thermal efficiency by excessive heat transfer between the hot and cold plates.

Figure 6:
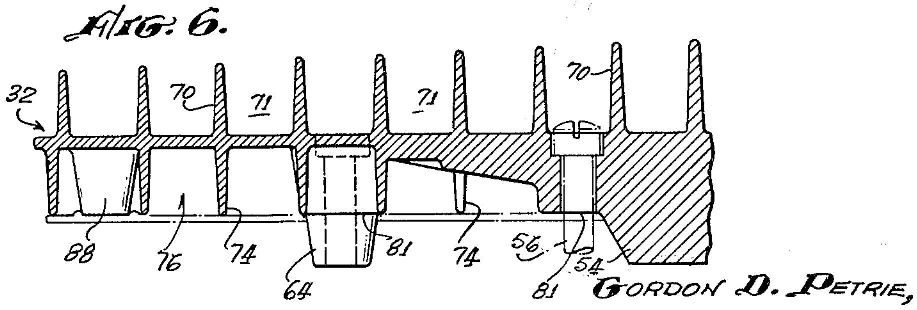
FIG. 6 is a section on the line 6—6 of FIG. 4, at enlarged scale.

The present structure disposes of heat from the hot plates by providing for effective and reliable natural air convection, and without requiring any forced circulation. Vertical, heat dissipating fins 70 are formed integrally on the outer faces of hot plates 32, extending the full height of those plates. The air channels 71 formed by those fins and the outer plate faces are of substantially square section, as shown best in FIG. 6, and provide effective chimney action to promote rapid air circulation. Vertical inner fins 74 are formed integrally on the inner faces of hot plates 32 in substantial alinement with the respective outer fins 70. The resulting air channels 76 between inner fins 74 communicate at their upper ends with outer channels 71 through the respective apertures 78 in the body of hot plate 32. The crest edges 75 of inner fins 74 on each hot plate lie in a common plane, as seen clearly in FIG. 6.

A baffle plate 80 overlies the inner fins of each hot plate, positively defining the inner air channels 76. The baffle plate is apertured to clear central boss 54 and the supporting bosses 64, and is supported by the annular shoulders 81, formed on the latter bosses, as well as by the fin edges. It is secured by screws 87 that enter threaded holes in the bosses 88 near the corners of hot plate 32. The upper edge of baffle plate 80 is outwardly flanged at 82. That flange overlies the upper ends of inner fins 74, terminating the air channels 76 above the apertures 78. The extreme ends of flange 82 are preferably formed to overlie the horizontal plate flanges 43 and are drilled to receive the screws 41, already described. The lower edge of each baffle plate 80 carries a stiffening flange 84, extending away from the adjacent hot plate. That flange has an upwardly offset central portion 85 conforming to the ridge 37 in the bottom of outer case 30. That case bottom is cut back at 77 from the face of each hot plate across substantially the entire width of the plate, but leaving the corner ears 78 which are secured by screws 42, already described. The cutouts 77 provide openings for upward air flow into air channels 76. Flanges 84 overlie the case bottom inward of those cutouts, serving to define its transverse position. Inner fins 74 on each hot plate 32 stop short of central boss 54 and supporting bosses 64. Thus air flowing in the inner channels 76 can circulate freely around the bosses.

Figure 3:
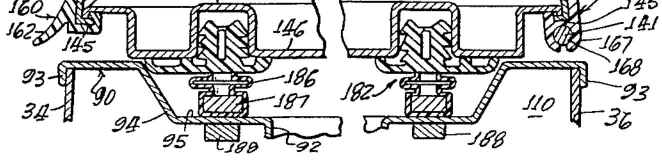
FIG. 3 is a detail of FIG. 1 at enlarged scale.
Figures 4, 5:
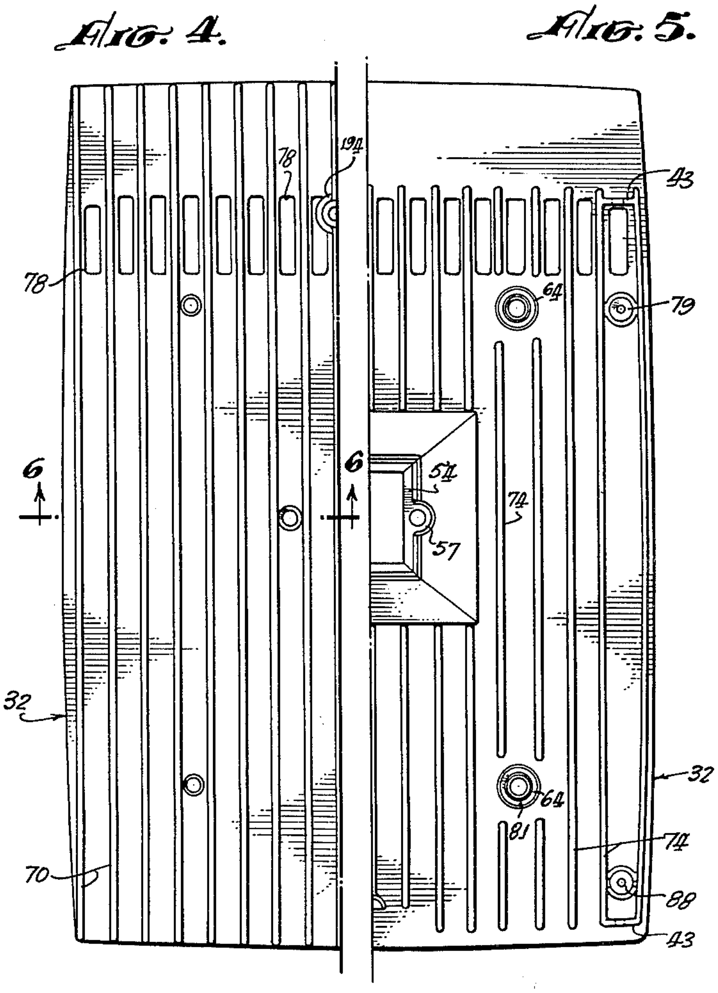
FIG. 4 is an exterior half-view of an end plate of the illustrative refrigerator.
FIG. 5 is an interior half-view corresponding to FIG. 4.

The breaker strip 90 is typically formed of suitable plastic, such as styrene, for example, and may be held in place by cement. It overlies the upper edge of all four vertical walls of inner case 10, and has an inner flange 92 that fits inside those walls all the way around. The breaker strip has slightly flanged front and back edges 93 that overlie the top edges of the front and back walls of the outer case 30. At the case ends it directly abuts the inner faces of hot plates 32 just above baffle plate flanges 82. The inner portion of the breaker strip is offset downwardly with an oblique offset portion at 94, forming a recessed horizontal face 95 adapted to be engaged by the door gasket, to be described (FIG. 3). The breaker strip closes the space between the inner and outer cases substantially at the level of the top of the inner case. The outer case end walls, namely the hot plates 32, extend above that level.

Thermostat mechanism is provided in close thermal contact with the walls of inner case 10, comprising an electrical switch adapted to turn on the current supplied to modules 50 when the interior of the refrigerator is warmer than the desired temperature, and to turn that current off when further cooling is not required. Such a thermostat mechanism is indicated at 100, mounted on an inwardly extending flange 102 of a flat mounting plate 103. That plate covers an aperture formed at the top of the rear wall of inner case 30. An inner housing formation 105 is fixedly mounted on the case wall inward of that aperture, enclosing the thermostat and separating it from the rest of the space between the two cases. Electrical wires, not explicitly shown, extend from the thermostat to the power supply apparatus, to be described. A thermostat adjustment for varying the refrigerator temperature is operated by a key through a small hole in breaker strip 90 directly above the thermostat. Plate 103 is removable with the thermostat through the interior of inner case 10 upon removal of the mounting screws 104.

The large open space between the inner and outer cases is filled with a suitable heat insulating material to minimize heat transfer to the inner case. That space, indicated by the numeral 110, excludes thermostat housing 105 and air channels 76 between baffle plates 80 and the hot plates. The insulation may be of any desired type, installed during or after assembly of the case. A preferred insulation material comprises polyurethane foam formed by polymerizing urethane foam in position after assembly of the case structure. The urethane foam, containing a suitable polymerization catalyst, is introduced into space 110 through one or more openings provided for that purpose. The openings are then closed by suitable plugs or caps. The described structure provides effective seals around baffle plates 80 to retain the insulating foam before it has solidified.

Electrical direct current power for energizing the modules is supplied by suitable electrical equipment, indicated somewhat schematically at 120. That equipment typically comprises one or more transformers 121 and rectifying circuits, which may be of conventional type, for converting 115 volt alternating current to direct current at the required low voltage of approximately two to four volts. That equipment provides power to the modules alternatively from 110 volt alternating current and from direct current at 6 to 12 volts, such as may be obtained from an automobile storage battery. It is preferred to provide two independent power circuits for the respective modules, so that any interruption in operation of one circuit will not incapacitate the refrigerator.

The electrical equipment mounted as a unit on the base plate 122 is enclosed by the housing 124, which preferably forms with the base a watertight chamber 123 for protection of the electrical system. Base 122 is of heavy gauge sheet material having high heat conductivity, such as aluminum, for example, and is formed with a deep flange 125 which is continuous around its periphery. Base plate 122 is mounted on the inner face of the rectangular bottom pan 130. Pan 130 has a mounting flange 132 along its front and rear upper edges that flatly supports outer case 30 along the front and rear edges of its bottom surface, as shown in FIG. 1. That flange is absent at the ends of the pan, as indicated at 133 in FIG. 2, providing openings through which air may freely flow from the surrounding atmosphere upwardly into inner air channels 76. The side flanges 132 extend as ears 135 beyond the edges 133 and are drilled to receive the mounting screws 43. Those screws also secure the front and back walls 34 and 36 to hot plates 32, as already described. Removal of those four screws detaches pan 130 from the case structure. The electrical system can then be removed for servicing or replacement; or removal of the cover plate 127, which forms part of housing 124, gives access to chamber 123 for maintenance of the circuit elements mounted on base plate 122.

The described mounting structure for the electrical system combines convenience and economy with compactness and efficiency of operation. The ridge 37 in the floor of outer case 30 accommodates a part of the height of transformers 121. Housing 124, which is preferably made of highly polished sheet material, prevents appreciable heat transfer from the electrical system to the main refrigerator structure. Instead, that heat is conducted by mounting plate 122 through its contact at flange 125 to pan 130, from the large surface of which it is dispersed to the atmosphere. The overhang of the main case structure beyond the walls of pan 130 provides an air passage 134 all the way around the base, and particularly at its ends, which maintains access of air to both the inner and outer air channels of the hot plates even when the refrigerator is placed close to a wall or between two pieces of luggage such as suitcases. The upper ends of both inner and outer air channels are also unlikely to be blocked accidentally, since the outer channels remain open upwardly if the refrigerator is placed close to a vertical wall, and remain open laterally if a flat object is placed on top of the refrigerator.

The door 140 is typically fabricated primarily from two pieces of sheet material, one forming the top 142 and the front and back side walls 143 and 144; the other forming the lower face 146 and the two end walls 147. The upper edges of those end walls are outwardly flanged, and the top is folded over them, as shown in FIG. 2 at 148. That fastening structure also extends down the side corners of the door, as indicated at 149 in FIG. 1. The lower edges of front and back side walls 143 and 144 are flanged, as shown best at 145 in FIG. 3. The front and back edges of lower face 146 are turned down at 150 and fit within the flanges 145.

The flange formations just described are clamped together by fasteners in the form of extrusions 160 and 166 which extend continuously along the entire front and rear lower edges, respectively, of the door. The section of those extrusions is such as to enclose the flange edges and hold them securely together, as shown clearly in FIG. 3. Rear extrusion 166 includes also two downwardly extending flanges 167 which define between them a channel of generally circular section adapted to enclose an elongated hinge pin 168. The ends of that pin are received in bores which are suitably located in the upwardly extending portions of hot plates 32 and which serve as hinge pivots for the door. Refining bushings 170 of nylon or the like are slipped over pin 168 between the cover end walls and hot plates 32, locating the door in spaced relation between the latter.

Front extrusion 160 is formed with a forwardly and downwardly extending flange 162 which serves conveniently as a handle with which to lift the door and swing it about hinge pin 168 to obtain access to the interior of the refrigerator. A slotted link is preferably coupled between the door and the opposing wall of one hot plate to limit the opening movement of the door in conventional fashion. Such a link is shown only schematically at 174 at the left of FIG. 2. The entire interior of door 140 is filled with a suitable insulating material. For example, foamed polyurethane, already described, may be inserted as a liquid foam through the aperture indicated at 175, which is later capped.

The lower face 146 of door 140 contains a deep channel 180 of rectangular section which extends around the door periphery directly above the flat face 95 of breaker strip 90. A gasket 182 of neoprene or the like has a tongue formation 183 inserted in channel 180. Two side flanges of the gasket overlie the door face on opposite sides of channel 180, the longer outer arm 184 being of such dimension as to engage breaker strip 90 near the top of its oblique face 94, forming a seal at that point. Gasket 182 also includes a relatively flexible, downwardly extending portion 186, which terminates in an enclosed chamber in which is mounted a magnetized square rod 187. An armature member 188 of iron or the like is mounted on the under face of breaker strip 90 directly opposite magnet 188. The attraction between the magnet and armature maintains a close sealing relation between the gasket and the breaker strip all the way around the case structure. The design is such that the gasket structure is recessed below the front wall of the refrigerator, which conserves space and also facilitates loading the interior.

The handle 190 is formed of tubing, with a central grip formation at 192, and is mounted on trunnions which comprise the handle bosses 194, formed integrally on the outer faces of the hot plates 32.

The exact difference in thickness between the thermoelectric module 50 and spacers 66 to exert the most advantageous degree of yielding force upon the modules depends upon the detailed design of the hot and cold plates, and upon such factors as the spacing of the support bosses from central mounting boss 52. Satisfactory results are usually obtainable with a value between about 0.003 and about 0.010 inch for that thickness difference.

It is usually advantageous to deposit insulation such as foamed plastic in the space within base pan 130 and the watertight housing that contains all of the electrical equipment subject to voltages higher than those supplied to the modules themselves. That insulation may be made to conform accurately to the underside of outer case 10, and to extend to the air passages to inner air channels 76, already described, but without obstructing those channels. Heat from the electrical equipment is then prevented from reaching the refrigerator proper or the air flowing to channels 76.

I claim:

1. A thermoelectric refrigerator comprising the combination of
- structure forming a generally rectangular inner case and an outer case spacedly enclosing the inner case, said cases being open on one side to provide access to the interior of the inner case,
- means closing the space between the cases at said open side,
- at least one vertical side of the inner case consisting essentially of a unitary thermally conductive cold plate having a central boss and a plurality of peripherally distributed bosses projecting from its outer face, the crest surfaces of said bosses being machined accurately to a common plane,
- at least the side of the outer case which corresponds to said vertical side of the inner case consisting essentially of a unitary thermally conductive hot plate having a central boss and a plurality of peripherally distributed bosses projecting from its inner face, the crest surfaces of said bosses on the hot plate being machined accurately to a common plane and spacedly opposing the crest surfaces of respective cold plate bosses,
- a thermoelectric module comprising an assembly of closely packed thermoelectric couples, the cold junctions of the couples being arranged adjacent a flat module cold face, and the hot junctions of the couples being arranged adjacent a flat module hot face that is parallel to the cold face and accurately spaced therefrom by a predetermined module thickness, the couples of the module being electrically connected for simultaneous direct current energization,
- means mounting the module with its hot and cold faces in electrically insulated and thermally conductive relation with the crest surfaces of the respective central bosses of the hot and cold plates,
- spacing elements of solid, dimensionally stable, heat insulating material positioned between the crest surfaces of opposing peripheral bosses of the hot and cold plates, the thickness of said spacing elements being closely equal to said predetermined module thickness,
- means forcibly urging the hot and cold plates toward each other at least adjacent each pair of corresponding peripheral bosses,
- heat insulating material between the inner and outer case structures,
- a door for releasably closing the open side of the cases,
- and means for electrically energizing the module with direct current of a polarity to make the cold elements cold and the hot elements hot.

2. A thermoelectric refrigerator as defined in claim 1, and wherein the thickness of each of said spacing elements is less than said predetermined module thickness by approximately 0.004 inch.

3. A thermoelectric refrigerator comprising the combination of
- structure forming a generally rectangular inner case and an outer case spacedly enclosing the inner case, said cases being open on one side to provide access to the interior of the inner case,
- means closing the space between the cases at said open side,
- two opposite vertical sides of the inner case each consisting essentially of a unitary thermally conductive cold plate having an integrally formed central boss and a plurality of integrally formed peripherally distributed bosses projecting from its outer face, the crest surfaces of said boses on each cold plate being machined accurately to a common plane,
- two opposite vertical sides of the outer case which correspond to said two sides of the inner case each consisting essentially of a unitary thermally conductive hot plate having an integrally formed central boss and a plurality of integrally formed peripherally distributed bosses projecting from its inner face, the crest surfaces of said bosses on each hot plate being machined accurately to a common plane and spacedly opposing the crest surfaces of respective cold plate bosses,
- two thermoelectric modules, each comprising an assembly of closely packed thermoelectric couples, the cold junctions of the couples being arranged adjacent a flat module cold face, and the hot junctions of the couples being arranged adjacent a flat module hot face that is parallel to the cold face and accurately spaced therefrom by a predetermined module thickness, the couples of each module being electrically connected for simultaneous direct current energization,
- Means mounting each module with its hot face in electrically insulated and thermally conductive relation with the crest surface of the hot plate central boss and with its cold face in electrically insulated and thermally conductive relation with the crest surface of the opposing cold plate central boss,
- spacing elements of solid, dimensionally stable, heat insulating material positioned between the crest surfaces, of opposing peripheral bosses of the hot and cold plates, the thickness of said spacing elements being closely equal to said predetermined module thickness,
- coupling means forcibly urging the opposing hot and cold plates toward each other at least adjacent each pair of corresponding peripheral bosses,
- heat insulating material between said inner and outer case structures,
- a door for releasably closing the open side of the cases,
- and means for electrically energizing the modules with direct current of a polarity to make the cold junctions cold and the hot junction hot.

4. A thermoelectric refrigerator as defined in claim 3, and wherein the thickness of each of said spacing elements is less than said predetermined module thickness by approximately 0.004 inch.

5. A thermoelectric refrigerator as defined in claim 3, and wherein said structure forming the inner case includes means positively defining the relative positions of the two cold plates, and said structure forming the outer case permits limited relative transverse movement of said two hot plates, whereby the transverse separation of said two hot plates is defined by said spacing elements, cold plates and inner case structure.

6. A thermoelectric refrigerator as defined in claim 3, and wherein each hot plate carries a plurality of vertical fins integrally formed on its inner face, the crests of said fins lying substantially in a common plane, at least the peripheral bosses of each hot plate being shouldered in said common plane, and said combination including a baffle plate overlying the crests of the fins and apertured at the cold plate bosses and supported on the shoulders thereof, the hot plate fins and the baffle plate defining vertical air channels, said heat insulating material being confined to the side of each baffle away from the hot plate, and air passage means communicating between the end portions of said channels and the exterior of the refrigerator.

7. A thermoelectric refrigerator comprising the combination of structure forming a generally rectangular inner case and an outer case spacedly enclosing the inner case, said cases having open tops providing access to the interior of the inner case, breaker strip means closing the space between said cases at the top of the inner case, two opposite vertical sides of the inner case each consisting essentially of a thermally conductive unitary cold plate having an integrally formed central boss, the two opposite vertical sides of the outer case which correspond to said two sides of the inner case each consisting essentially of a unitary hot plate having an integrally formed central boss, two thermoelectric modules, each comprising an assembly of closely packed thermoelectric couples, the cold junctions of the couples being arranged adjacent a flat module cold face, and the hot junctions of the couples being arranged adjacent a flat module hot face that is parallel to the cold face and accurately spaced therefrom by a predetermined module thickness, the couples of each module being electrically connected for simultaneous direct current energization, means mounting each module with its hot face in electrically insulated and thermally conductive relation with the crest surface of the hot plate central boss and with its cold face in electrically insulated and thermally conductive relation with the crest surface of the opposing cold plate central boss, structure forming a generally rectangular hollow door adapted to overlie said breaker strip means and to releasably close the open top of the inner case, said hot plates extending above said breaker strip means adjacent respective opposite side walls of the door and terminating substantially in the plane of the top face of the door, each of said hot plates having an array of vertical fins on its outer face extending essentially the full height of the hot plate and defining open-ended vertical air channels that are longer than the height of the other two sides of the outer case, structure forming a compartment below the bottom of said outer case and forming a supporting base therefore, the outer case overhanging said compartment at least on said two opposite sides and forming air passage means adapted to supply air to the lower ends of said air channels, and means contained in said compartment for energizing the modules with direct current of a polarity to make the cold junctions cold and the hot junctions hot.

8. A thermoelectric refrigerator as defined in claim 7, and wherein each of said hot plates has an array of vertical fins on its inner face corresponding to said outer fins and defining vertical inner air channels, said hot plates being apertured to supply air from the upper ends of said inner air channels to respective channels between said outer fins, said combination including means for supplying air from said air passage means to the lower ends of said inner air channels.

9. A thermoelectric refrigerator as defined in claim 3, and wherein said coupling means comprise alined bores in the respective peripheral bosses of the hot plates and cold plates, and threaded fasteners received in said bores, at least the surface portions of the fastener shanks being formed of solid, dimensionally stable, heat insulating, dielectric material.

10. A thermoelectric refrigerator as defined in claim 3, and wherein each module is peripherally notched, said combination including elements of dielectric material fixedly mounted adjacent opposite edges of the central bosses and adapted to engage the module notches and thereby define the module positions in the plane of the crest surfaces between which they are mounted.

References Cited in the file of this patent

UNITED STATES PATENTS

| | | |
|---|---|---|
| 2,932,953 | Becket | Apr. 19, 1960 |
| 2,978,875 | Lackey | Apr. 11, 1961 |
| 2,991,628 | Tuck | July 11, 1961 |
| 3,018,631 | Bury | Jan. 30, 1962 |
| 3,040,539 | Gaugler | June 26, 1962 |